UNITED STATES PATENT OFFICE.

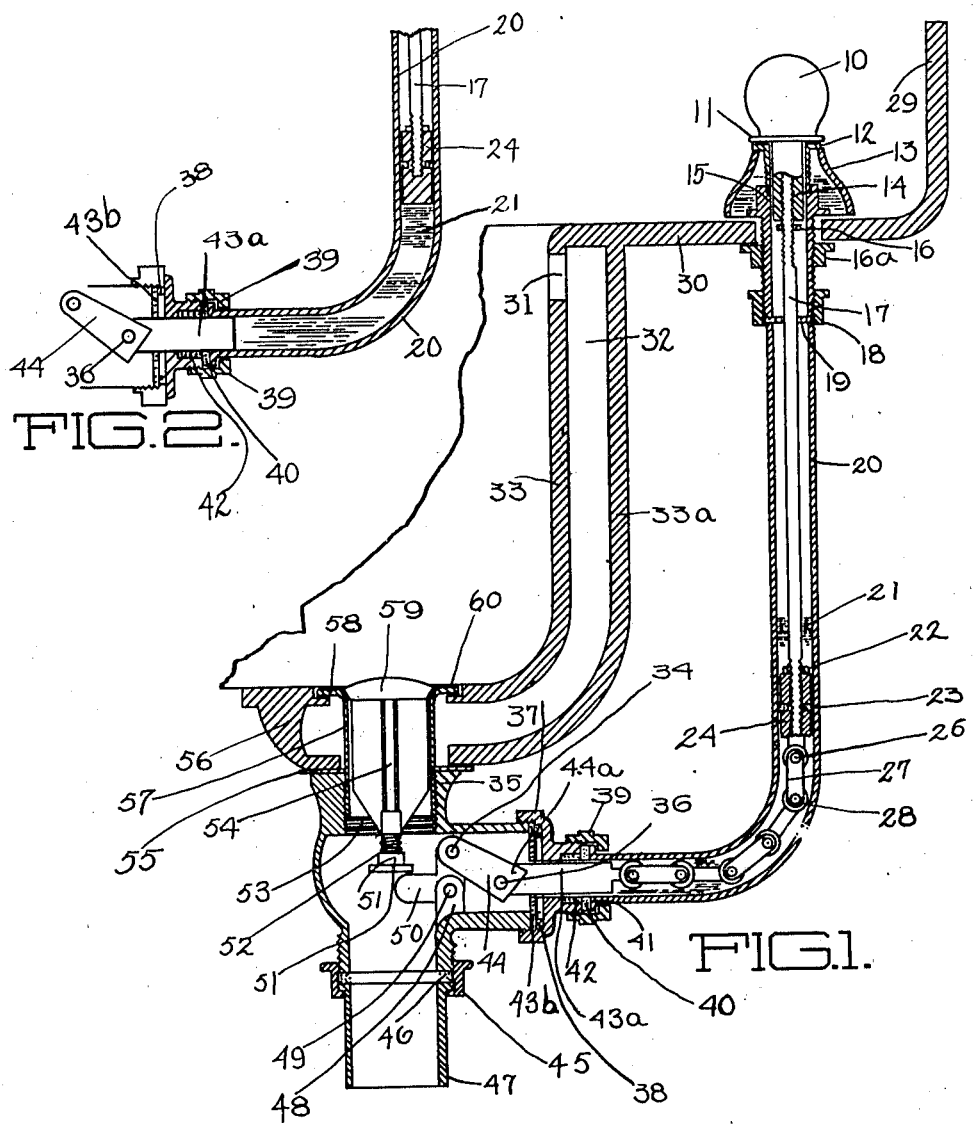

WILLIAM J. BERGENS, OF CLEVELAND, OHIO, ASSIGNOR OF ONE-FOURTH TO CARLETON L. TERRY AND ONE-FOURTH TO JOHN A. BOMMHARDT, OF CLEVELAND, OHIO.

POP-UP WASTE-VALVE.

1,035,849. Specification of Letters Patent. Patented Aug. 20, 1912.

Application filed July 31, 1911. Serial No. 641,685.

*To all whom it may concern:*

Be it known that I, WILLIAM J. BERGENS, a citizen of the United States, residing at Cleveland, in the county of Cuyahoga and State of Ohio, have invented certain new and useful Improvements in Pop-Up Waste-Valves, of which the following is a specification.

This invention relates to waste valves, and particularly to so called pop up waste valves and fixtures used on lavatories, bath tubs and the like.

The object of the invention is to provide an improved waste valve, and improved operating devices for the same.

A further object of the invention is to provide a fixture in which the working parts are inclosed, and in which all movable parts subject to friction are submerged in oil.
A further object of the invention is to provide an improved connection between an operating handle or button and the waste valve, in order to operate the latter, the valve being of the type which is lifted to discharge the waste water.

Various other improvements and advantages with respect to the details of the fixture will be evident from the following description and the accompanying drawings.
In the drawings,—Figure 1 is a vertical sectional view of the device, Fig. 2 is a sectional detail of a modification.

Referring specifically to the drawing, 10 is the waste knob or handle, provided with a metal ring 11 and connected to a rod 17 to which it is screwed as at 14 with a lock nut 16 to hold it.

12 is a ferrule with a flange at the upper end engaging over the top of an escutcheon
13. The ferrule screws into a tubular connection 15 which extends through the slab 30 of the lavatory and is fastened by a lock nut 16ª screwed thereon under the slab. The tube 15 is connected to a lower tube 20 by a coupling 18 with packing 19. The tube 20 is curved as shown and contains oil which fills the lower part of the tube as indicated at 21. At the lower end of the rod 17 is a piston 24, preferably formed in two parts with a washer or packing 23 therebetween, to form a tight joint with the tube, the parts being held by a lock nut 22. A chain 27 is connected at 26 to the lower piston, and said chain is provided at its joints with rollers 28. The chain extends in the bend of the tube, and is connected to another piston 43ª which projects into a special angular fitting 35 fitting against the bottom of the lavatory bowl. The piston 43ª projects into said fitting and is pivotally connected at 36 to a link 44ª which is pivotally connected at 34 to a bell crank lever 50 pivoted at 49 on lugs 48. The side arm or tube of the angular fitting 35 has a removable bonnet 37, with a washer 38 to make a tight joint, and the lower end of the pipe 20 is connected to the bonnet by a coupling nut 39 engaging flange 41 on the tube, with a washer 40 at the joint.

42 is a stuffing box inside the washer 40, filled with packing to prevent leak of the oil in the tube, and the piston 43ª slides in said stuffing box.

43 is a metal plate set in between the washer 38 and a shoulder 43ᵇ, to form a guide for the piston 43ª and to form a stop against which the extended end 44ª of the link strikes to prevent excessive movement backwardly of the piston.

The fitting 35 is connected to a coupling 47 by a nut 45 with a washer 46 at the joint. The horizontal arm of the bell crank 50 bears under the foot 51 of the screw 52 which is adjustable in the waste plug 54, to properly set the parts and take up wear or warping. The hollow plug casing 57 is screwed into the fitting 35 to couple the same to the basin, with a washer 55 at the joint, and a flange 58 at the top of the casing to fit in a recess 60 provided in basins or tubs of the kind. 59 is the head or stopper of the plug fitting in the top of the tube or casing 57.

In the modified form shown in Fig. 2 the chain 27 is omitted, the space between the pistons 21 and 42ª being simply filled with oil. The oil between the pistons makes a solid liquid column, as the tight joints allow no access of air. Accordingly when the knob 10 is pulled up the suction will carry with it the lower piston 42ª, and through the bell crank and other connections the plug valve will be lifted to let out the waste. When the handle is pushed down the piston 43ª is shoved inwardly and the valve closes. Ordinarily no chain is needed, but inasmuch as wear or leakage may occur, so as to dislodge the solid body of oil between the pistons, the chain may be used, to give a positive connection, and inasmuch as the chain and pistons are inclosed in oil there is very little friction and the action is practically noiseless. The movable connections are all inclosed and not exposed, making a very neat fit, and one which cannot be disarranged or disturbed by children or careless persons. Under ordinary conditions the oil will remain in the tube indefinitely.

Having thus described my invention, what I claim as new and desire to secure by Letters Patent is:

1. The combination with a basin or the like and a valve therefor, of valve operating devices including a member bearing against the valve, a piston, a body of lubricating material adapted to act on the piston, and a casing in which the piston and lubricating material are confined.

2. The combination with a basin or the like, and a valve therefor, of valve operating devices including a casing, pistons in the casing, a valve operating member engaging the valve and connected to one piston, a handle connected to the other piston, and a body of fluid confined in the casing between the pistons.

3. The combination with a basin or the like and a valve therefor, of valve operating devices including a casing containing a lubricant, an operating member engaging the valve, a handle, and connections extending through the casing, between the handle and the said member.

4. The combination with a valve, of valve operating devices including a member engaging the valve, a casing containing a lubricant, a handle, and connections between the handle and the said member, including a flexible member in the casing.

5. The combination with a valve, of valve operating devices operatively engaging the same, including a tube containing a lubricant, and a chain confined in said tube.

6. The combination with a valve, and an operating member bearing against the same, of a tube, pistons in the tube, one piston being operatively connected to the said member, a body of lubricating fluid in the tube between the pistons, a flexible connection in the tube, between the pistons, and a handle connected to the other piston.

7. The combination with a basin or the like and a valve therefor, of means to operate the same, including a confined body of fluid, a piston acting on said fluid, and a handle connected to the piston.

8. The combination with a valve casing, a valve therein, and a lever bearing against the valve, of a tube opening into said casing, a body of oil confined in said tube, a chain operatively connected to the lever and movable in the tube, said chain having rollers at its joints, and a handle connected to the chain.

In testimony whereof, I do affix my signature in presence of two witnesses.

WILLIAM J. BERGENS.

Witnesses:
 JOHN A. BOMMHARDT,
 STEDMAN J. ROCKWELL.